United States Patent
Isakiewitsch

(10) Patent No.: US 10,328,976 B2
(45) Date of Patent: Jun. 25, 2019

(54) AXLE SUPPORT FOR A MULTI-TRACK MOTOR VEHICLE

(71) Applicant: AUDI AG, Ingolstadt (DE)

(72) Inventor: Christian Isakiewitsch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 104 days.

(21) Appl. No.: 15/611,871

(22) Filed: Jun. 2, 2017

(65) Prior Publication Data

US 2017/0349215 A1 Dec. 7, 2017

(30) Foreign Application Priority Data

Jun. 4, 2016 (DE) ........................ 10 2016 006 848

(51) Int. Cl.
*B62D 21/15* (2006.01)
*B60G 7/00* (2006.01)
(Continued)

(52) U.S. Cl.
CPC ........... *B62D 21/155* (2013.01); *B60G 7/008* (2013.01); *B60K 5/12* (2013.01); *B62D 21/11* (2013.01);
(Continued)

(58) Field of Classification Search
CPC ........ B62D 21/11; B62D 21/155; B60G 7/08; B60G 2206/60; B60G 2206/016
See application file for complete search history.

(56) References Cited

U.S. PATENT DOCUMENTS

| 2004/0070129 A1* | 4/2004 | Budde .................... B60G 7/001 267/188 |
| 2005/0151392 A1* | 7/2005 | Yasukouchi ......... B62D 21/152 296/187.03 |

(Continued)

FOREIGN PATENT DOCUMENTS

| DE | 102011112057 A1 * | 3/2013 | ............. B60G 7/001 |
| DE | 102011112057 A1 | 3/2013 | |

(Continued)

OTHER PUBLICATIONS

Thomas Gorges, Wheel guide arm for independent wheel suspension of e.g. passenger car, has upper and lower stiffening portions provided at respective upper and bottom flanges in a state angled inwardly and extending in first end portion, Mar. 7, 2013, EPO, DE 10 2011 112 057 A1, English Abstract (Year: 2013).*

(Continued)

*Primary Examiner* — James A English
(74) *Attorney, Agent, or Firm* — Maier & Maier, PLLC

(57) ABSTRACT

The invention relates to an axle support for a multi-track motor vehicle, having a first side member, a second side member, and at least one cross member connecting the first side member and the second side member to one another, wherein at least one control arm is articulated at bearing points of the first side member and of the second side member to connect a wheel carrier for a wheel of the motor vehicle. In doing so, a provision is that each of the bearing points is arranged in a bearing connection area of the corresponding side member, in which the side member has less stiffness perpendicular to its longitudinal extension than away from the bearing connection area.

9 Claims, 2 Drawing Sheets

(51) Int. Cl.
*B60K 5/12* (2006.01)
*B62D 21/11* (2006.01)

(52) U.S. Cl.
CPC .... *B60G 2206/016* (2013.01); *B60G 2206/60* (2013.01)

(56) References Cited

U.S. PATENT DOCUMENTS

| | | | | |
|---|---|---|---|---|
| 2011/0198889 | A1* | 8/2011 | Takeshita | B62D 21/11 296/203.02 |
| 2014/0110925 | A1* | 4/2014 | Goellner | B62D 21/155 280/781 |
| 2014/0217777 | A1 | 8/2014 | Tanaka et al. | |
| 2014/0312654 | A1* | 10/2014 | Komiya | B62D 21/11 296/187.09 |
| 2015/0021115 | A1* | 1/2015 | Komiya | B62D 21/11 180/312 |
| 2016/0110925 | A1* | 4/2016 | Ben Kenaid | G01S 19/13 705/13 |
| 2018/0079452 | A1* | 3/2018 | Kramer | B62D 21/15 |

FOREIGN PATENT DOCUMENTS

| | | |
|---|---|---|
| DE | 102012024145 A1 | 6/2014 |
| DE | 102013207144 A1 | 10/2014 |
| WO | 2015-166115 A1 | 11/2015 |

OTHER PUBLICATIONS

Thomas Gorges, Wheel guide arm for independent wheel suspension of e.g. passenger car, has upper and lower stiffening portions provided at respective upper and bottom flanges in a state angled inwardly and extending in first end portion, Mar. 7, 2013, EPO, DE 10 2011 112 057 A1, Mach. Trans. of Desc. (Year: 2013).*
German Examination Report dated Jan. 13, 2017 in corresponding DE102016006848.5; 8 pages.

* cited by examiner

AXLE SUPPORT FOR A MULTI-TRACK MOTOR VEHICLE

FIELD

The invention relates to an axle support for a multi-track motor vehicle having a first side member, a second side member, and at least one cross member connecting the first side member and the second side member to one another, in which at least one control arm is articulated at the bearing points of the first side member and the second side member to connect a wheel carrier for a wheel of the motor vehicle.

BACKGROUND

The axle support is used to connect the wheel carrier to the motor vehicle, particularly to a body of the motor vehicle. The body is preferably designed as a self-supporting body. The axle support may also be characterized as a subframe or support frame. It is rigidly connected, to the body, for example, bolted to it, for example. In this case, it is characterized as an integral subframe. Alternatively, it may be connected to the body by means of a damper, for example, by way of vibration-damping connecting elements.

The axle support is intended for the multi-track motor vehicle. Correspondingly, it offers the possibility of connecting multiple wheel carriers, in which at least two of the wheel carriers are allocated to the same wheel axle, for example a front axle or a rear axle. Within the scope of this description, only one of the wheel carriers is always addressed. However, it is obvious that the corresponding designs can always be transferred to multiple, particularly all of the wheel carriers that are connected to the axle support.

The wheel of the motor vehicle is mounted on the wheel carrier so as to rotate, particularly in a wheel bearing arranged on and/or attached to the wheel carrier. The wheel carrier is attached by means of at least one control arm, but preferably by means of a plurality of control arms. The control arm or any of the control arms engages the wheel carrier on one side and engages the axle support on the other side. The control arm or at least one of the control arms engages at one of the bearing points of the axle support. One of the bearing points is arranged on the first side member and another of the bearing points is arranged on the second side member, preferably lying opposite to one another. In the latter case, the bearing points are thus arranged at the same positions on the side members.

Both of the side members can extend at least approximately in the main travel direction of the motor vehicle. For example, they are arranged at least approximately or precisely parallel to one another. For example, they are arranged and/or formed as mirror images with respect to a central longitudinal axis of the axle support, in which the central longitudinal axis may be parallel to the main direction of travel or may coincide with it. The two side members, namely the first side member and the second side member, are connected to one another by means of the at least one cross member, preferably in a rigid manner. More preferably, a plurality of cross members spaced apart from one another are provided, in which each of the cross members connects the two side members with one another. The cross members are positioned, for example, at least approximately perpendicularly with respect to the main direction of travel of the motor vehicle or of the center longitudinal axis of the axle support. The cross members are preferably arranged spaced apart from one another in the axial direction with respect to the center longitudinal axis.

SUMMARY

The object of the invention is to propose an axle support for a multi-track motor vehicle, which has advantages over known axle supports, particularly an improved collision behavior.

This is achieved according to the invention with an axle support. In doing so, a provision is that the bearing points are each arranged in a bearing connection area of the corresponding side member, in which the side member has less stiffness perpendicular to to its longitudinal extension than away from the bearing connection area.

Each of the bearing points is thus positioned in one of a plurality of bearing connection areas. Each of the bearing connection areas is allocated to one of the side members, i.e., either the first side member or the second side member. In other words, each of the side members has at least one bearing connection area, in which one bearing point is arranged for one of a plurality of control arms, wherein a wheel carrier is articulated or can be articulated for a wheel of the motor vehicle by means of any of the control arms. Within the scope of this description, one of the bearing points is always addressed in the following. The corresponding designs, however, can always be transferred to other bearing points of the axle support.

When there is a collision of the motor vehicle involving an obstacle, particularly a head-on collision with low coverage in the transverse direction, it is possible for the wheel carriers and consequently the wheel of the motor vehicle to be displaced in the lateral direction so that the wheel may penetrate into a passenger compartment of the motor vehicle. The lateral displacement is caused, for example, by a connection of the wheel carrier to the axle support by means of another control arm in order for its connection point at the axle support of the wheel carrier to rotate jointly with the additional control arm during the collision. In order to prevent this, there may be a provision, for example, for the connection between the axle support and the additional control arm to detach in the event of a collision. To this end, there may be provided a corresponding mechanism for this.

However, because it is essentially undesirable for components to detach from one another in the event of a collision and correspondingly for the structure of the motor vehicle to weaken, on the one hand, and to have free ends present, on the other hand, in this case, a free end of the additional control arm, whereby the risk of injury is increased, a special embodiment of the bearing attachment area shall be provided in which the bearing point is provided to articulate the control arm. For example, the wheel carrier is connected to the axle support via the control arm and via the additional control arm, particularly connected so as to be able to swivel. This means that both the control arm and the additional control arm are connected to the wheel carrier so as to rotate on one side and are articulated to the axle support so as to rotate on the other side.

The control arm is arranged, for example, in the axial direction with respect to the center longitudinal axis of the axle support in the main direction of travel, behind the additional control arm. The additional control arm engages, when viewed in the main direction of travel, both the wheel carrier and the axle support further to the front than the control arm. The control arm and the additional control arm, however, may be present in the same plane, particularly in the same horizontal plane, i.e. in the vertical direction. For example, the control arm and the additional control arm in this case are arranged below or above at least one other control arm, by which the wheel carrier is likewise articulated to the axle support.

The bearing connection area, in which the bearing point for the control arm is arranged, should then, perpendicularly with respect to its longitudinal extension, which preferably extends parallel to the center longitudinal axis of the axle support, have less stiffness than away from or outside of the bearing connection area. The side member can consequently be comparatively simply laterally displaced in the bearing connecting area, particularly laterally toward the outside. In the event of a collision in which the wheel, and accordingly the wheel carrier, is impacted with an axial force, the bearing connecting area is laterally deformed to the outside such that the distance increases between the wheel carrier and the corresponding side member or the axle support as such. This occurs particularly due to a force acting on the side member having the bearing connection area during the collision. Due to the deformability of the bearing connection area, the side member is compressed toward the outside in the axial direction by the force with the simultaneous displacement of the bearing connection area.

Accordingly, an inward rotation of the wheel is counteracted so that it is displaced, at best, in the axial direction in the direction turned away from the obstacle or is even rotated outwardly. With such an embodiment of the axle support, the collision behavior of the motor vehicle can be significantly improved. In particular, the risk of injury for occupants of the motor vehicle is significantly reduced, because the previously described penetration of the wheel into the passenger compartment is effectively prevented.

Within the scope of a further embodiment of the invention, a provision is that at least one of the bearing connection areas is present as a laterally displaced offset area, particularly an offset area displaced toward the outside, of the respective side member. With respect to the center longitudinal axis of the axle support, the bearing connection area should thus be positioned further laterally than another area of the corresponding side member. The offset area is arranged offset with respect to other areas of the side member, particularly with respect to areas directly connected to it. Due to the displacement of the offset area, a target deformation area is created, which facilitates the deformation of the side member in the bearing connection area perpendicularly with respect to the longitudinal extension of the side member and simultaneously facilitates a deformation-effecting compression of the side member in the axial direction.

An enhancement of the invention stipulates that the offset area has two legs and a curvature connecting the two legs with one another. The two legs are arranged, for example, symmetrically with respect to one another. Each of the legs can merge into the corresponding side member away from the bearing connection area on one side and into the curvature on the other side. Both legs preferably extend continuously into the curvature. The curvature may be symmetrical, similar to the two legs, so that the arrangement comprising the two legs and the curvature as a whole is symmetrical, particularly axis-symmetrical from the perspective above looking onto the side member or the axle support.

Within the scope of a further preferred embodiment of the invention, a provision is that the bearing point is arranged in an angular point or turning point of the offset area, particularly of the curvature. The bearing point is thus allocated to the offset area and is positioned there in its angular point or turning point. The angular point is understood to be, for example, the point of the offset area that is the furthest displaced in the lateral direction. The turning point on the other hand describes a point in the offset area at which a curvature of the offset area is equal to zero. The turning point may coincide with the angular point. In this case, the distance, for example, between the offset area and the center longitudinal axis of the axle support directly increases on one side of the angular point or the turning point and directly decreases on the other side.

The angular point or the turning point in this respect represents that point in the offset area in which the derivative of the distance between the offset area and the center longitudinal axis of the axle support over the position in the axial direction is equal to zero. The aforementioned conditions are particularly fulfilled when the bearing point is allocated to the curvature or is arranged in the angular point or the turning point of the curvature.

A further embodiment of the invention provides that imaginary center longitudinal axes of the legs undercut one another at an obtuse angle. Each of the legs has this type of center longitudinal axis. They undercut each other either directly or lie at least in imaginary planes that undercut each other. The center longitudinal axes or the planes should form a certain angle with respect to one another. It is especially preferable for this angle to be obtuse, i.e. greater than 90°. In this type of embodiment, a simple deformation of the bearing connection area is enabled. Alternatively, it may obviously be provided that a right angle or an acute angle is present between the central longitudinal axes or the planes. For example, an angle of from 60° to 120°, from 70° to 110°, or from 80° to 100° is provided.

A further preferred embodiment of the invention provides that the respective bearing point is present below or above a support profile forming the offset area, particularly a hollow support profile, of the side member. The articulation of the control arm to the bearing connection area of the side member is thus offset with respect to the side member, particularly with respect to its center longitudinal axis, namely in the installation position of the axle support in the vertical direction. The bearing point correspondingly lies below or above the side member or the support profile forming the side member. The support profile may, for example, be composed of solid material. However, the support profile is especially preferably present in the form of the hollow support profile in order to achieve a weight-reduced design of the axle support.

A further embodiment of the invention provides that the offset area merges at two connecting points spaced apart from one another, particularly into support areas of the side member flush with one another. The support areas are thus provided on both sides of the offset area. One of the support areas connects to a first side at the offset area, while another support area connects to a second side lying opposite to the first side. The support areas connect to the offset area between them in this respect. The transition between the offset area and the support areas takes place at the connection points. While obviously the support areas may be arranged offset with respect to one another, particularly parallel-offset with respect to one another, a flush arrangement of the support areas is preferable. This means that the center longitudinal axes of the support areas coincide with one another, i.e. lie within one another. A high level of stiffness of the axle support is achieved in the axial direction with this type of configuration.

In an especially preferred embodiment of the invention, a provision is that at least one of the support areas, particularly both support areas, is/are straight, at least on their side facing toward the offset area. The straight configuration of the support areas serves to increase the stiffness of the axle support in the axial direction. More preferably, the support areas are designed to be straight throughout. This applies at least, however, to their side facing toward the offset area. For example, the entire straight area of the respective side member connecting to the offset area is designated the support area.

Within the scope of a further embodiment of the invention, a provision is that the offset area transition into one of the support areas by way of at least one bend, wherein at least one stiffness-reducing wall opening is formed in the wall of the support profile in the bend. Obviously, it is advantageous when this applies to both support areas, so that the offset area thus transitions into the support areas via bends, wherein the stiffness-reducing wall opening is present in at least one of the bends, preferably in both bends.

The wall opening is formed in the wall of the support profile and preferably extends completely through the wall or the support profile. In the case of the solid profile, the wall opening can thus extend through the entire support profile, while in the case of the hollow support profile, for example, only the wall of the support profile extends through on one side of the support profile. Obviously, a plurality of wall openings in total may be provided in the bend or the bends, which are formed spaced apart from one another in the peripheral direction in the support profile.

For example, it is provided that the wall opening is arranged laterally on the support profile. The wall opening in this regard lies on the side facing toward the center longitudinal axis of the axle support or the side of the support profile facing away from it. The wall opening is arranged such that it reduces the stiffness of the side member or of the bearing connection area so that the bearing connection area can be simply displaced in the lateral direction as is the case for the side member away from the bearing connection area.

Additionally or alternatively, a provision may be that the wall opening has larger dimensions in the peripheral direction of the support profile than in the longitudinal direction. The wall opening in this respect is present in the form of a slit or a slot. In order to merely achieve the simple displacement of the bearing connection area in the lateral direction, but not, however, weaken the axial stiffness of the axle support, the dimensions of the wall opening in the peripheral direction of the support profile are larger than in its longitudinal direction. For example, the wall opening is provided at one of the connection points. More preferably, this type of wall opening is allocated to each of the connection points. In addition, a plurality of wall openings may be present for each connecting point, particularly diametrically opposed to one another on the support profile.

Finally, a provision for a further preferred embodiment of the invention is that at least one installation site for an engine mount and/or for a body is formed or arranged on at least one of the support areas. The engine mount or the body can engage at the installation site. The engine mount is provided, for example, to mount a drive unit for the motor vehicle, for example, an internal combustion engine. More preferably, the axle support has several of these types of installation sites, in which, for example, an installation site is provided at each of the side members. In addition, one or more additional installation sites may be present at the cross member or at least one of the cross members.

The invention obviously also relates to a motor vehicle having an axle support, which may be designed according to the aforementioned embodiments. With respect to advantageous embodiments of the axle support, reference is made to the corresponding designs.

BRIEF DESCRIPTION

The invention is explained in more detail in the following by way of exemplary embodiments, without limiting the invention. Herein:

DETAILED DESCRIPTION

Figure 1:
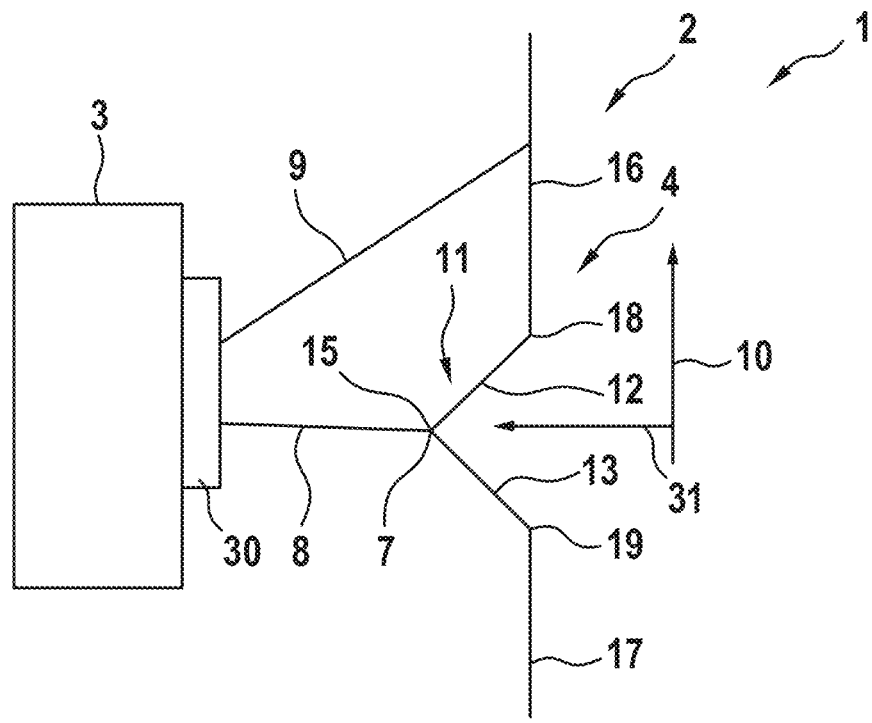
FIG. 1 shows a schematic representation of an area of a motor vehicle, namely an area of an axle support having a wheel connected to the axle support by a wheel carrier, wherein a configuration of the axle support before a collision is shown.

FIG. 1 shows a schematic representation of an area of a motor vehicle 1, namely an axle support 2, on which a wheel 3 of the motor vehicle 1 is suspended. Coming from the axle support 2, a first side member 4 is shown here. Next to the first side member 4, the axle support 2 has an additional, second side member 5, which is not shown here, however. The two side members, 4 and 5, are connected to one another via a cross member 6, which is also not shown. The side member 4 has a bearing point 7, to which a control arm 8 is articulated, particularly so that it is able to swivel. The control arm 8 is used to connect a wheel carrier, which is not discernible here, in which the wheel 3 of the motor vehicle 1 is mounted so as to rotate. Next to the control arm 8, an additional control arm 9 is provided, which is used to also connect the wheel carrier to the axle support 2, particularly the side member 4. For example, control arm 9 engages further toward the front on the side member 4 than control arm 8 in the main direction of travel of the motor vehicle 1, as indicated by the arrow 10.

The bearing point is arranged in a bearing connection area 11 of the side member 4. In the bearing connection area 11, the side member 4 has less stiffness perpendicular to its longitudinal extension, i.e. preferably perpendicular to the main direction of travel indicated by the arrow 10, than away from the bearing connection area 11. To this end, the bearing connection area 11 is designed as a laterally displaced offset area. It is obviously discernible that the offset area is displaced toward the outside in the lateral direction, i.e. in the direction of the wheel carrier or of the wheel 3.

For example, the offset area 11 has two legs, 12 and 13, which are connected to one another, for example, by way of a curvature 14, which is not shown here. The bearing point 7 is arranged in an angular point 15 of the bearing connection area 11. In particular, the bearing point 7 lies between the two legs 12 and 13, or at a connection point of the two legs 12 and 13. The two legs 12 and 13, or the center longitudinal axes of the legs 12 and 13, meet each other at a certain angle. Said angle is formed as a right angle in the exemplary embodiment shown here. An obtuse angle, i.e. an angle greater than 90°, is preferred, however.

The side member 4 has support areas 16 and 17, away from the bearing connection area 11. These areas are preferably flush with one another so that their central longitudinal axes coincide. The support areas, 16 and 17, are more preferably straight, particularly continuously straight. The support areas 16 and 17, accommodate the bearing connection area 11 between them, which in turn transitions to the support areas 16 and 17 at the connection points 18 and 19. For example, the bearing connection area is thus connected to support area 16 by way of connection point 18 on one side and is connected to support area 17 via connection point 19 on the other side. For example, the other control arm 9 engages at support area 16.

Figure 2:
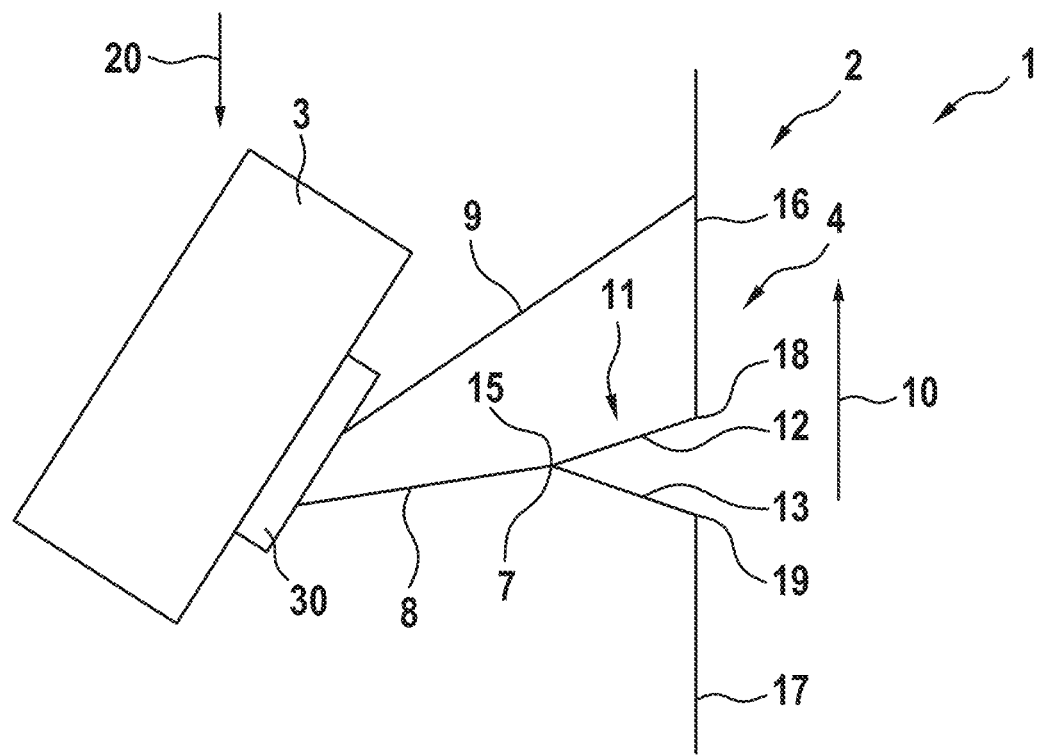
FIG. 2 shows a schematic representation of the axle support according to FIG. 1 in a configuration after a collision.

FIG. 2 shows a schematic representation of the area of the motor vehicle 1 after a collision, in which a force directed against the main direction of travel (arrow 10), indicated by arrow 20, acts upon the wheel 3 or the wheel carrier. This causes a rotational motion of the wheel 3, which can cause penetration of the wheel 3 into a passenger compartment of the motor vehicle 1 when there is a normal connection of the control arm 8 to the side member 4. This is prevented by the special embodiment of the bearing connection area 11. The embodiment enables a displacement of the bearing point 7 in the lateral direction toward the outside, so that control arm 8 detaches from the side member 4 or at least from the support areas 16 and 17. Accordingly, there is a rotation of the wheel 3; however, this is not directed around a bearing point of the control arm 9 on the side member 4, but instead around an axis of rotation present in the area of the wheel 3. As a whole, the wheel 3 is displaced opposite the main direction of travel 10 due to the collision, without the wheel 3 coming too close to the axle support 2.

This results from an impact of the side member 4 with the force in the axial direction in effect during the collision. The force is introduced, for example, into the bearing connection area 11 by way of the support area 16. Due to the deformability of the bearing connection area 11, the force causes a compression of the side member 4 in the axial direction, whereby, in turn, the bearing connection area 11 deforms in the lateral direction, and consequently, the bearing point 7 is displaced or pushed to the outside. Thus, the force displaces the connection points 18 and 19 toward one another in the axial direction so that they have less distance from one another in the axial direction than before, after the introduction of force or the deformation of the bearing connection area 11 or the compression of the side member 4. The connection points 18 and 19 are displaced toward one another in this respect during the deformation of the bearing connection area 11.

Figure 3:
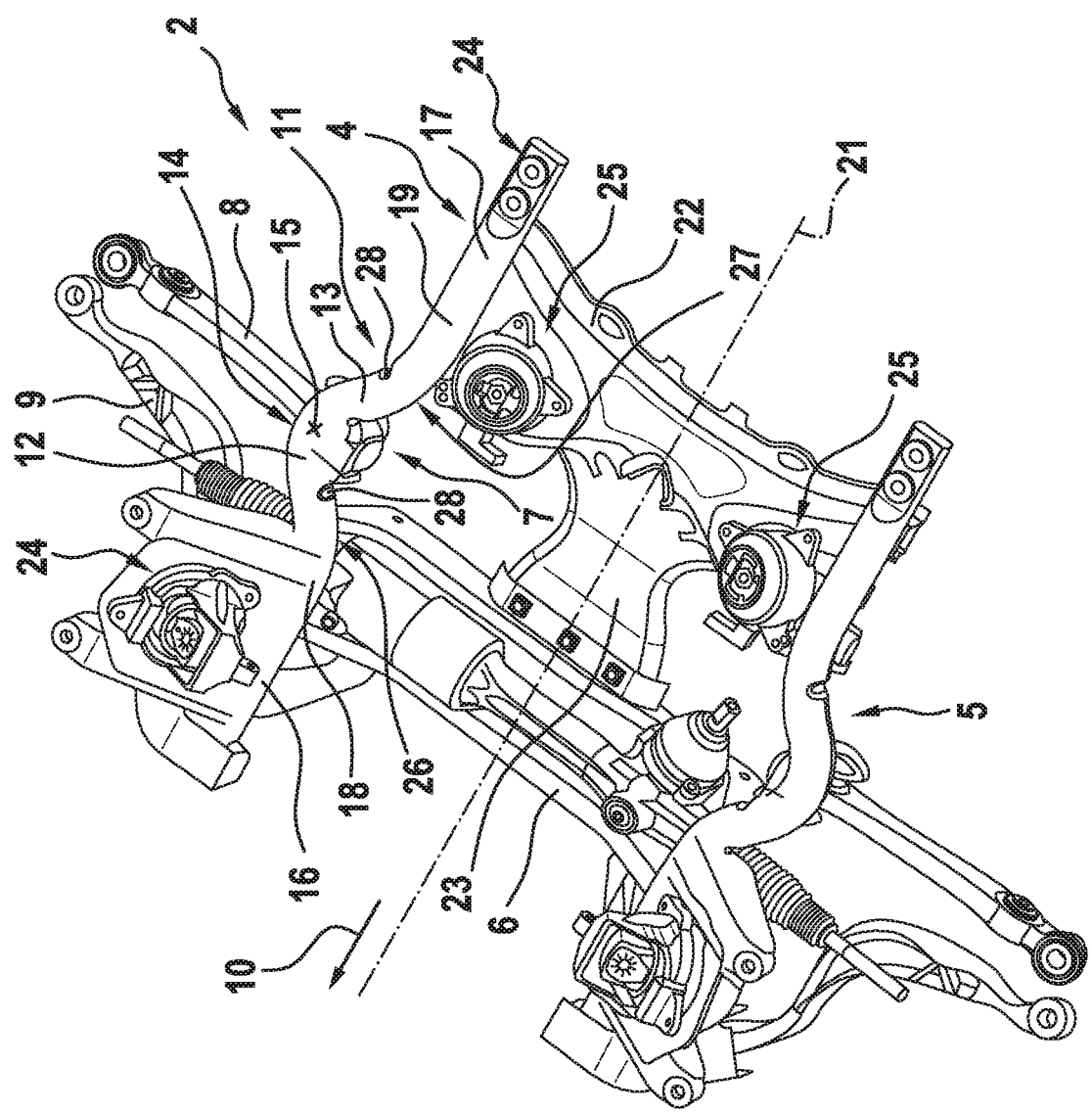
FIG. 3 shows another representation of the axle support with a control arm connected to it for connecting the wheel carrier.

FIG. 3 shows another schematic representation of the axle support 2 as well as control arms 8 and 9. It is obvious that the axle support 2 is constructed essentially symmetrically with respect to its center longitudinal axis 21. In this regard, similar elements are provided in part with the same reference numbers. The designs with respect to one of the elements can be transferred to the other respective element. It is discernible that the two side members, 4 and 5, are rigidly connected to one another by means of the cross member 6. An additional cross member 22 is provided next to cross member 6. The side members, 4 and 5, are also rigidly connected to one another via these cross members. In the exemplary embodiment shown here, cross members 6 and 22 are connected to one another by means of a bar 23, such that they can also be viewed as a common cross member.

At least one installation site 24 is formed or arranged for an engine mount or for a body at at least one of the support areas 16 and 17, which is at two support areas 16 and 17 in the exemplary embodiment shown here. In the exemplary embodiment here, the installation site 24 arranged in the support area 16 is provided for the engine mount and the installation site 24 present in the support area 17 is intended for the body. Further installation sites 25 for the engine mount may be provided, for example, on the cross member 22.

It is discernible that the bearing connection area 11 transitions into the support areas 16 and 17 by way of the bends 26 and 27. The bends 26 and 27 are intended for implementing a continuous transition. It is further discernible that at least one wall opening, preferably a plurality of wall openings 28, is/are formed in the bends 26 and 27. The at least one wall opening 28 engages the wall of a support profile forming the bearing connection area 11 or the side member 4, with the support profile more preferably being formed as a hollow support profile.

The embodiment of the motor vehicle 1 or the axle support 2 shown here enables an especially advantageous behavior of the axle support 2 or of the wheel 3 during or upon a collision of the motor vehicle 1 with an obstacle.

The invention claimed is:

1. An axle support for a multi-track motor vehicle, comprising:
   a first side member, a second side member, and at least one cross member connecting the first side member and the second side member with one another, wherein at least one control arm is articulated at a first bearing point of the first side member and a second bearing point of the second side member for connecting a wheel carrier for a wheel of the motor vehicle, wherein the first and second bearing points are each arranged in a bearing connection area of the corresponding side member, in which the first and second side members have less stiffness perpendicular to a direction of travel of the motor vehicle than a direction away from the bearing connection area toward an outside of the respective side member, wherein the bearing connection areas each form an offset area displaced toward the outside of the respective side member, wherein when a force is applied to the wheel carrier in a direction against the direction of travel of the motor vehicle, at least one of the first and second bearing points is displaced in a lateral direction away from the motor vehicle.

2. The axle support according to claim 1, wherein each offset area has two legs and a curvature connecting the two legs with one another.

3. The axle support according to claim 1, wherein the first and second bearing points are respectively arranged in an angular point or turning point of the offset area.

4. The axle support according to claim 2, wherein an imaginary center longitudinal axes of the legs undercut one another at an obtuse angle.

5. The axle support according to claim 1, wherein the respective bearing points are positioned below or above a support profile forming the respective offset area of the respective side member.

6. The axle support according to claim 1, wherein each offset area transitions into support areas of the respective side member at two connection points spaced apart from one another.

7. The axle support according to claim 6, wherein at least one of the support areas, is straight.

8. The axle support according to claim 6, wherein each offset area transitions into one of the support areas by means of at least one bend, wherein at least one stiffness-reducing wall opening is formed in a wall of the support profile in the at least one bend.

9. The axle support according to claim 6, wherein at least one installation site for an engine mount and/or for a body is formed or is arranged at at least one of the support areas.

* * * * *